United States Patent Office 2,741,635
Patented Apr. 10, 1956

2,741,635

THIOSEMICARBAZONES OF ALICYCLIC MONO-KETONES WITH A BENZENE NUCLEUS CONDENSED IN α,β-POSITION

Karl Hoffmann, Binningen, and Eugen Tagmann, Basel, Switzerland, assignors to Ciba Pharmaceutical Products, Inc., Summit, N. J.

No Drawing. Application March 3, 1952,
Serial No. 274,666

Claims priority, application Switzerland March 16, 1951

5 Claims. (Cl. 260—552)

The present invention relates to thiosemicarbazones of alicyclic monoketones with a benzene nucleus condensed in α:β-position. More particularly, it has especial relation to the thiosemicarbazones of 1-oxo-1,2,3,4-tetrahydronaphthalene, of 1-oxo-indane and of α,β-benzocycloheptanone, primary interest being ascribed to 1-oxo-1,2,3,4-tetrahydronaphthalene-thiosemicarbazone of the formula

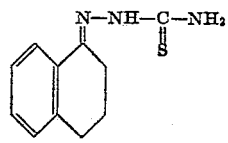

and to 1-oxo-6-hydroxy-1,2,3,4-tetrahydronaphthalene-thiosemicarbazone of the formula

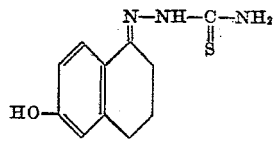

The said compounds may be substituted on the benzene nucleus and also on the hydroaromatic nucleus. Preferred substituents are a substituted or unsubstituted hydroxy group such as an acyloxy group or an alkoxy group or the OH-group itself, or a carboxy, carbalkoxy, amino or acylamino group or an alkyl or phenyl radical.

The new compounds possess valuable therapeutic properties. Thus, they effect a differentiated restraint or promotion of endocrine functions, especially of the hypophysis.

The new thiosemicarbazones are obtained when a thiosemicarbazide, particularly thiosemicarbazide itself, is reacted with an alicyclic monoketone with a benzene nucleus condensed in α,β-position.

The following examples illustrate the invention. The relation between part by weight and part by volume is the same as that between gram and cubic centimeter. The temperatures are given in degrees centigrade.

Example 1

23.4 parts by weight of 1-oxo-1,2,3,4-tetrahydronaphthalene, 14.6 parts by weight of thiosemicarbazide and 100 parts by volume of absolute ethanol are maintained in a closed vessel for 6 hours at a temperature of 125–130°. The separated 1-oxo-1,2,3,4-tetrahydronaphthalene thiosemicarbazone of the formula

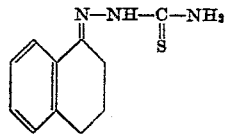

is filtered off and when recrystallized from alcohol has a melting point of 198–200°.

Example 2

273 parts by weight of thiosemicarbazide are dissolved in a mixture of 7000 parts by volume of water and 600 parts by volume of glacial acetic acid at a temperature of 70°. Thereupon 438 parts by weight of 1-oxo-1,2,3,4-tetrahydronaphthalene, dissolved in 6000 parts by volume of absolute alcohol are added, and then the reaction mixture is heated under reflux for ½ hour. The reaction mixture is allowed to stand overnight, the separated 1-oxo-1,2,3,4-tetrahydronaphthalene-thiosemicarbazone is filtered off and recrystallized from alcohol. It melts at 198–200°.

Example 3

16.2 parts by weight of 1-oxo-6-hydroxy-1,2,3,4-tetrahydronaphthalene, 9.1 parts by weight of thiosemicarbazide and 30 parts by volume of absolute alcohol are maintained in a closed vessel for 6 hours at a temperature of 120–130°. The separated 1-oxo-6-hydroxy-1,2,3,4-tetrahydronaphthalene-thiosemicarbazone of the formula

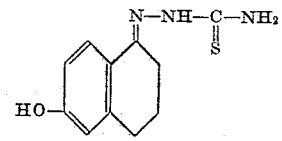

is filtered off and when recrystallized from ethyl acetate with the addition of ligroin, has a melting point of 199–201°.

From the 1-oxo-6-hydroxy-1,2,3,4-tetrahydronaphthalene-thiosemicarbazone, the corresponding sodium salt can be produced for example in the following manner:

18.3 parts by weight of the 1-oxo-6-hydroxy-1,2,3,4-tetrahydronaphthalene-thiosemicarbazone are boiled with 4.2 parts by weight of sodium methylate and 100 parts by volume of absolute methanol for one hour under reflux. The reaction mixture is evaporated to dryness under reduced pressure and the residue recrystallized from water. The sodium salt of the 1-oxo-6-hydroxy-1,2,3,4-tetrahydronaphthalene-thiosemicarbazone forms yellow needles of melting point 210°.

Example 4

26.4 parts by weight of 1-oxo-indane, 21 parts by weight of thiosemicarbazide and 100 parts by volume of absolute ethanol are heated in a closed tube for 6 hours to 120–125°. The separated 1-oxo-indane-thiosemicarbazone of the formula

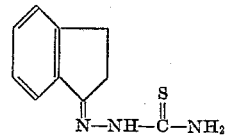

is recrystallized from a mixture of alcohol and ethyl acetate. It melts at 175–176°.

Example 5

5.9 parts by weight of 1-oxo-3-phenyl-indane, 2.7 parts by weight of thiosemicarbazide and 30 parts by volume of alcohol are heated in a bomb tube for 6 hours to 125–130°. The thus-obtained 1-oxo-3-phenyl-indane-thiosemicarbazone of the formula

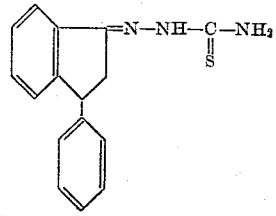

when recrystallized from alcohol, melts at 160–163°.

Example 6

5.0 parts by weight of 1-oxo-4-carbomethoxy-5-methyl-6-methoxy-1,2,3,4-tetrahydronaphthalene are heated to 120–130° for 6 hours in a closed receptacle with 1.9 parts by weight of thiosemicarbazide and 20 parts by volume of alcohol. The crystalline reaction product is filtered off and recrystallized from a mixture of ethyl acetate and ligroin. The obtained 1-oxo-4-carbomethoxy-5-methyl-6-methoxy-1,2,3,4-tetrahydronaphthalene-thiosemicarbazone of the formula

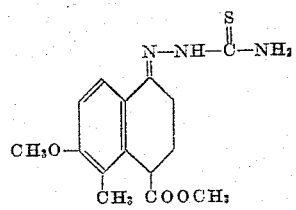

melts at 211–213°.

Example 7

2.3 parts by weight of thiosemicarbazide, 75 parts by volume of water and 5 parts by volume of glacial acetic acid are heated on the water-bath until a clear solution is produced. This solution is added to a solution of 4.4 parts by weight of 1-oxo-5-methyl-6-hydroxy-1,2,3,4-tetrahydronaphthalene in 60 parts by volume of absolute alcohol, whereupon the entire mixture is boiled under reflux for 15 minutes. After the reaction mixture has cooled, the formed 1-oxo-5-methyl-6-hydroxy-1,2,3,4-tetrahydronaphthalene-thiosemicarbazone of the formula

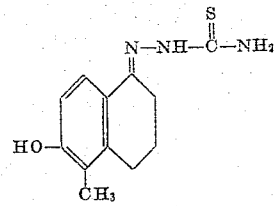

is filtered off. Recrystallized from alcohol, the product melts at 208–212°.

Example 8

4.4 parts by weight of 1-oxo-4-phenyl-1,2,3,4-tetrahydronaphthalene, 1.8 parts by weight of thiosemicarbazide and 20 parts by volume of alcohol are heated to 120–130° for 6 hours in a closed receptacle. The resultant 1-oxo-4-phenyl-1,2,3,4-tetrahydronaphthalene-thiosemicarbazone of the formula

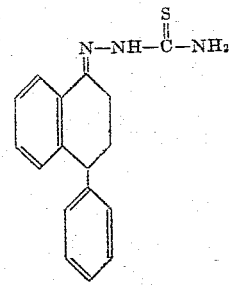

is filtered off. Recrystallized from a mixture of ethyl acetate and ligroin, the product melts at 225–229°.

Example 9

4.68 parts by weight of 1-oxo-5-carboxy-7-methoxy-benzosuberane are dissolved in 50 parts by volume of absolute alcohol. To this solution are added 1.8 parts by weight of thiosemicarbazide, dissolved in 60 parts by volume of hot water and 4 parts by volume of glacial acetic acid and the reaction mixture is refluxed on the water bath for 15 minutes. After cooling, the resultant 1-oxo-5-carboxy-7-methoxy-benzosuberane-thiosemicarbazone of the formula

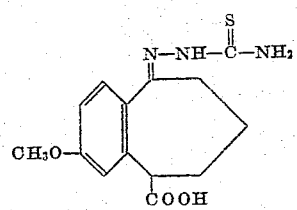

is separated by filtration. It is soluble in alkalies and after recrystallization from glacial acetic acid with addition of water melts at 188–189°.

What is claimed is:

1. A thiosemicarbazone of the formula:

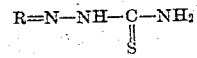

wherein R is a member selected from the group consisting of 1,2,3,4-tetrahydronaphthyl-(1); 6-hydroxy-1,2,3,4-tetrahydronaphthyl-(1); indanyl-(1); 3-phenyl-indanyl-(1); 4-carbomethoxy-5-methyl-6-methoxy-1,2,3,4-tetrahydronaphthyl-(1); 5-methyl-6-hydroxy-1,2,3,4-tetrahydronaphthyl-(1); 4-phenyl-1,2,3,4-tetrahydronaphthyl-(1); and 5-carboxy-7-methoxy-benzosuberyl-(1) radicals.

2. 1-oxo-1,2,3,4-tetrahydronaphthalene-thiosemicarbazone.
3. 1-oxo-6-hydroxy-1,2,3,4-tetrahydronaphthalene-thiosemicarbazone.
4. 1-oxo-indane-thiosemicarbazone.
5. 3-oxo-1-phenyl-indane-thiosemicarbazone.

References Cited in the file of this patent

Schuler et al.: "Arch. int. pharmacodyn.," vol. 87, August 1, 1951, pp. 290–291.
Sah et al.: "Rec Trav Chim," vol. 69 (1950), p. 1552.
Evans: "J. Chem. Soc." (London), 1943, page 569.